Figure 3:
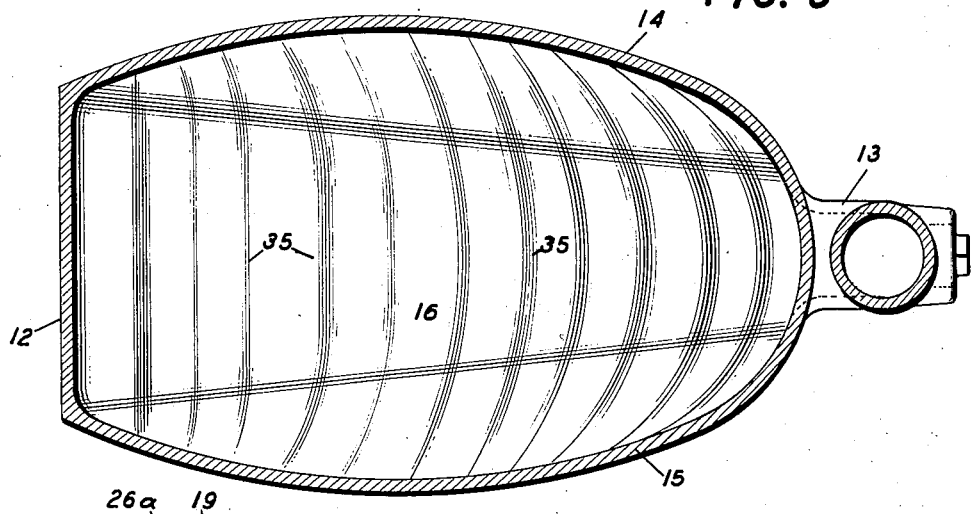

April 6, 1937.                S. L. MARSH                2,076,380
                              OIL INTERCEPTOR
                        Filed Oct. 25, 1933        3 Sheets-Sheet 1
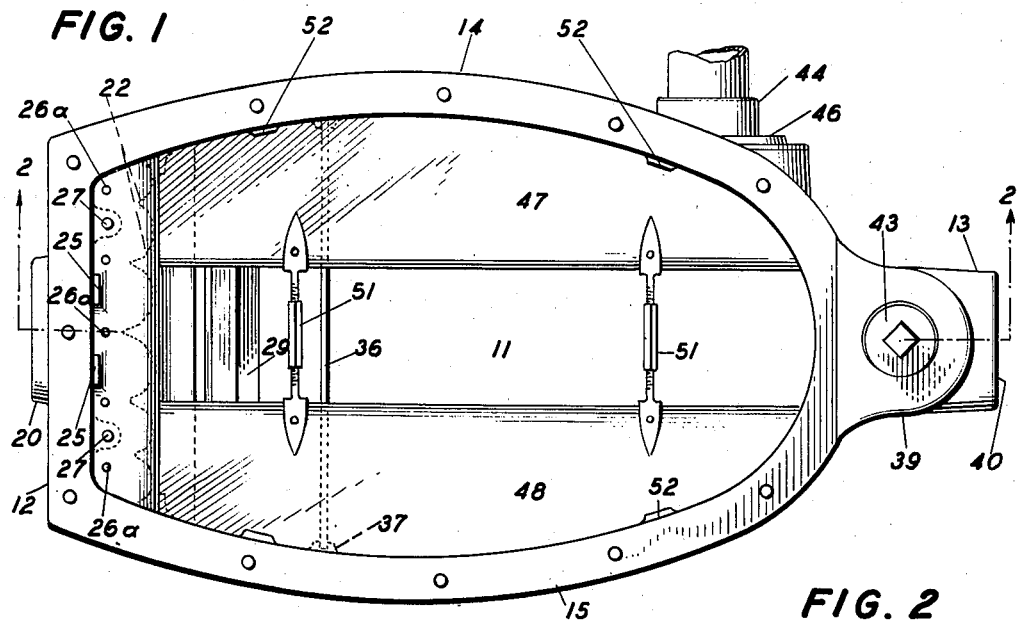
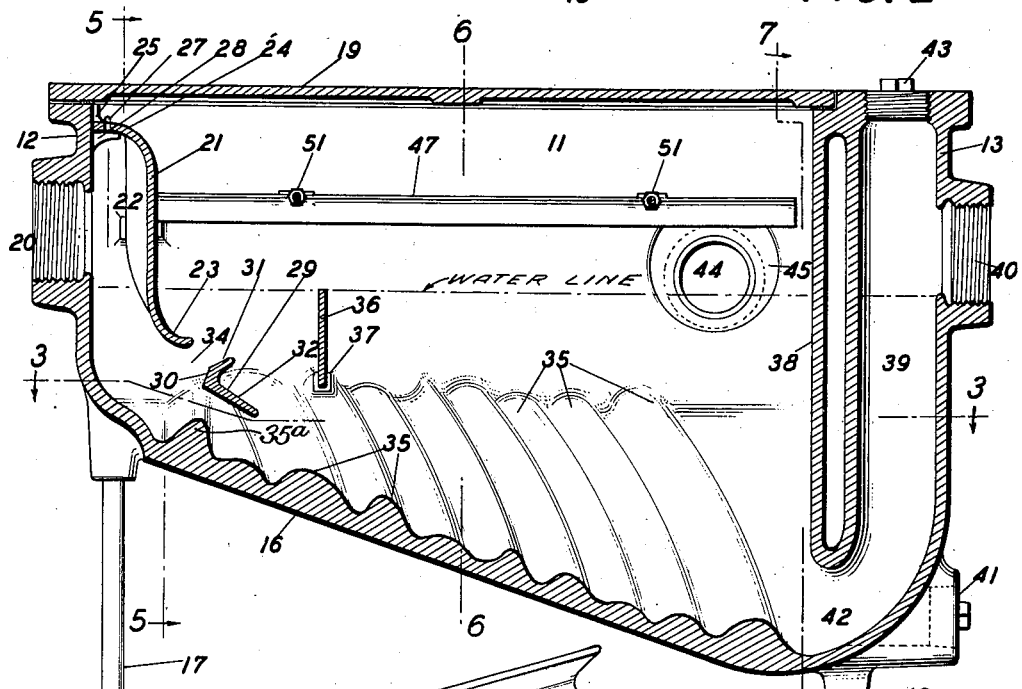
INVENTOR
SAMUEL L. MARSH
BY Arthur Middleton
ATTORNEY April 6, 1937.　　　S. L. MARSH　　　2,076,380
OIL INTERCEPTOR
Filed Oct. 25, 1933　　　3 Sheets-Sheet 2

INVENTOR
S. L. MARSH
BY
ATTORNEY

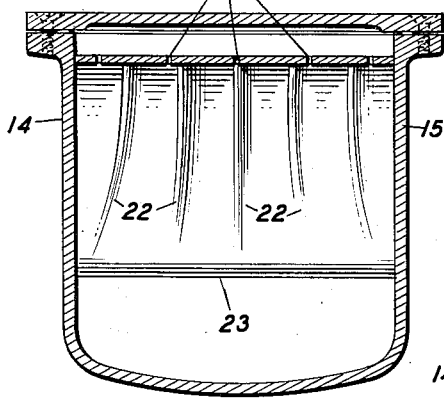
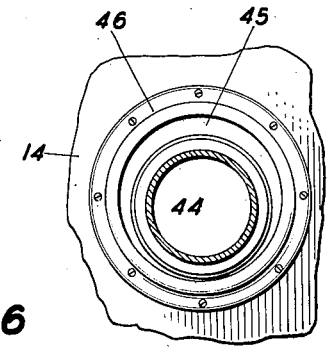
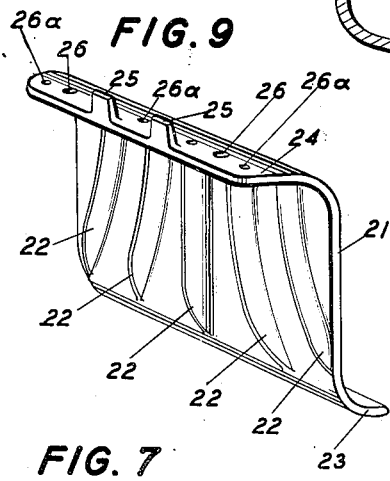
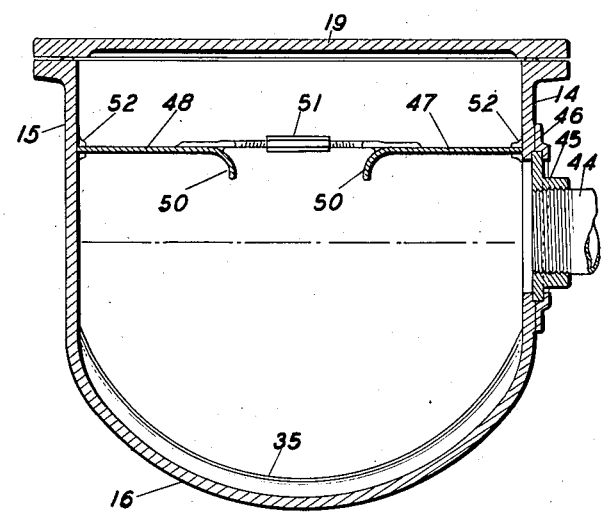
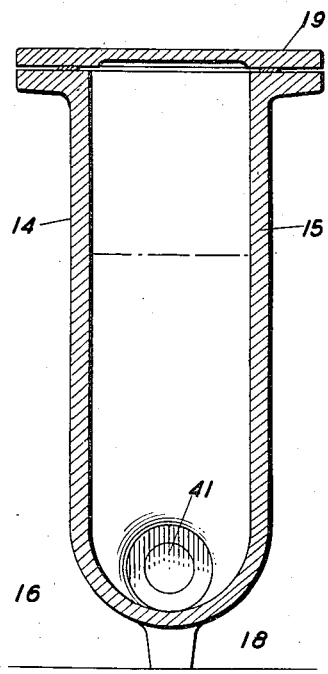
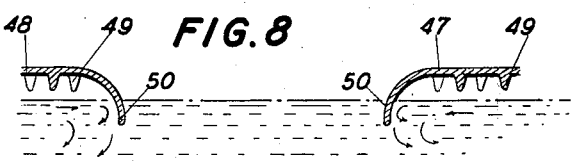

Patented Apr. 6, 1937

2,076,380

UNITED STATES PATENT OFFICE 2,076,380

OIL INTERCEPTOR

Samuel L. Marsh, New York, N. Y., assignor to M. Calm, New York, N. Y.

Application October 25, 1933, Serial No. 695,203

19 Claims. (Cl. 210—56)

This invention relates generally to the separation of liquids having different specific gravities or of floatable solids from a liquid in which they may be carried. More particularly, it relates to the separation and recovery of oil or oily substances from water, such as in the reclamation of oil from the bilge-water of ships, the sedimented water of oil-storage tanks, the prevention of stream pollution, and the like.

The objects of the invention include the design of interceptor devices for oil or floatable solids arranged for operating continuously; for operating under unstable conditions as on ship-board; for operating with a wide range of capacities; and devised to produce separating impulses acting upon the mixture as soon as it enters the separating or intercepting container, preferably in a manner whereby these impulses act progressively on the mixture to be treated.

The invention involves the flowing of the mixture to be treated under a quiescent body of fluid whereby the submergence causes separating impulses to be set up in the mixture with the lighter separated substance rising into the quiescent body of fluid and the other separated liquid from the basin. The invention may be carried out by the use of a container, tank, or basin, substantially ovoid in shape in plan view but with a flattened inlet end. In side elevation, the basin is trapezoidal in shape, wherein the bottom of the basin slopes so that the outlet end thereof is deeper than the inlet end. The invention may be said to reside in the means for deflecting and baffling the current flow through the basin to produce the separation of the substances having different specific gravities to an efficient degree. That is, the incoming mixture to be separated first encounters a guide baffle plate for dispersingly directing the incoming mixture outwardly and downwardly toward the sides and bottom of the basin for setting up initial separating impulses because the deeper the lighter substances are submerged, the greater is their urge to rise to the surface. Associated with the baffle plate is a deflector having a face slightly inclined from the vertical and wings or flanges, one of which is directed upwardly and one downwardly. The inclined face has the combined functions of guiding downwardly any sediment from the mixture which may impinge thereon; of acting as a stop or dampener for lessening the velocity of the current flowing thereagainst; and of upwardly deflecting and impelling the lighter substances or fluid. A throat-like passage is formed between the upward flange and the baffle-plate for giving a substantially Venturi-tube action whereby the downflowing incoming mixture impels through the throat upwardly into the quiescent body of fluid thereabove, those particles of oil which have already been separated from the mixture. The downwardly directed flange on the deflector causes a further deeper submergence of the mixture whereby a greater separating impulse is set up to act upon the lighter substances which have not yet separated from the mixture. The lighter separated substances escaping from the downflowing mixture and flowing upwardly past and around the deflector encounter a further baffle bar to prevent the horizontal flow of such particles by assuring that they flow upwardly into the quiescent body of similarly separated lighter substances or oil particles from which quiescent body there is a continuous overflow or effluent. The separating impulses created by the baffle plate, deflector and baffle bar may be supplemented by serrations or undulations or rugae on the basin bottom which are hereinafter more particularly described. The invention also contemplates the use of splash or stabilization plates, when needed, to keep the quiescent body of oil or other separated material from splashing due, for instance, to the tossing of the ship on which the basin may be located. By the use of these plates at all times, an even flow of oil is permitted to escape from outlet 44 of the main reservoir whereby uninterrupted continuous operation of the separator is obtained.

The invention also contemplates to provide for an adjustable outlet level for the reclaimed oil, so that the accuracy in the skimming off of the layer may be controlled.

A feature provides for eccentric means to effect the adjustment of the oil overflow level in an oil outlet connection.

The invention possesses other objects and features, some of which, with the foregoing, will be set forth in the following description. In the accompanying drawings, there has been illustrated the best embodiment of my invention known to me but such embodiment is to be regarded as typical only of many possible embodiments and my invention is not limited thereto.

Figure 4:
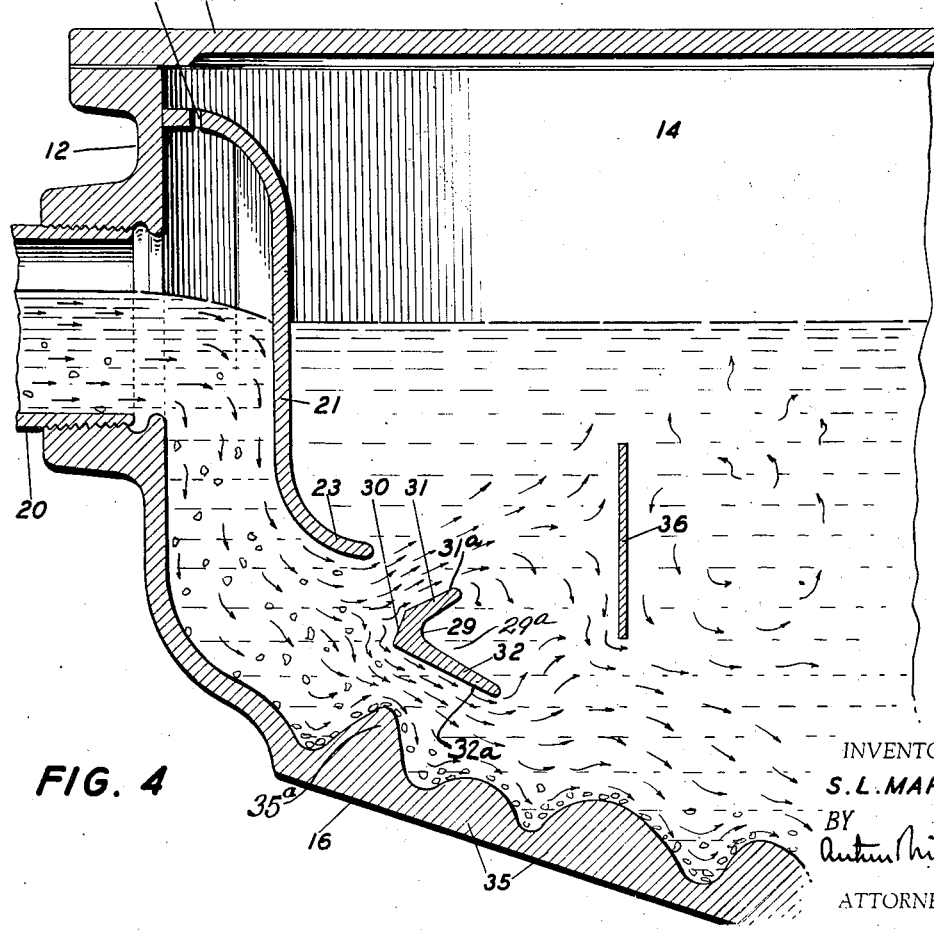

In the drawings, Figure 1 shows a plan view of my interceptor with the top removed. Figure 2 shows a vertical longitudinal sectional view taken along line 2—2 in Figure 1. Figure 3 shows a horizontal sectional view taken along line 3—3 in Figure 2. Figure 4 shows an enlarged partial vertical sectional view through the inlet end of my interceptor. Figure 5 shows a vertical transverse sectional view taken along line 5—5 in Figure 2.

Figure 6 shows a similar view taken along line 6—6 in Figure 2. Figure 7 shows another similar view taken along line 7—7 in Figure 2. Figure 8 is a detailed partial view illustrating the operation of the splash plates. Figure 9 is a perspective view of the baffle plate. Figure 10 shows an elevational view of the adjustable oil inlet. Figure 11 shows a perspective view of the deflector.

In the drawings 11 indicates my interceptor container or basin substantially ovoid in shape and trapezoidal in longitudinal cross section, having a flattened inlet end 12, a water outlet end 13 and curved side walls 14 and 15. 16 indicates the sloping bottom of the basin, while 17 and 18 indicate legs which may be used for supporting the basin. Characteristic of the shape of the basin is a relative shallowness at the inlet and a gradual transition into increasingly depressed and concave configuration towards the outlet end, the body curvatures of the basin as a whole making it nearly pouchlike in appearance. 19 represents a removable top for the basin. 20 indicates the inlet to the basin, 21 a guide-plate extending across the inlet end of the basin and having downwardly diverging ribs 22 thereon or extending therefrom, 23 a lower curved portion or lip thereof, 24 an upper horizontal portion or edge thereof provided with upstanding lugs 25 and gas vent openings 26a; also with apertures 26 for engagement with pins 27 extending from a bracket or brackets 28 carried on the inside wall of the inlet end 12 of the basin for supporting the guide plate 21 in place, to the maintaining of which positioning the lugs 25 contribute by bearing against the inner wall of the inlet end 12 of the basin.

29 indicates a deflector or deflector bar which has a substantially wedge-like cross-sectional profile or more specifically a profile which is in the way of a blunted wedge. The apex portion of the profile points in a direction opposite to the flow of liquid through the basin, the profile being defined by a central portion having a front face 30 inclined slightly from the vertical when in place, as shown, an upwardly extending flange or wing 31 having an outer face 31a, and a downwardly extending flange or wing 32 having an outer face 32a, with the downward extension 32 forming with the face 30, an edge 33 (see Fig. 11). The wings 31 and 32 include between them a hollow 29a. The deflector bar 29 and the lower portion 23 of the guide plate 21 form a throat or throat-like constriction therebetween. The flange 32 is shown to extend farther in the direction of flow of the entering mixture than the flange 31, both flanges 31 and 32 defining a hollow in the rear portion of the deflector bar 29, with the rear or trailing edges of the flanges 31 and 32 constituting points of eddying of the entering mixture. 35 indicates serrations, corrugations or rugae, preferably of irregular height upstanding from the basin bottom 16 and curved in plan view as shown in Fig. 3, toward the inlet end 12 of the basin to present concave curves to the mixture to be treated flowing over the basin bottom.

The first one of these rugae is significant in that it forms a lower lip 35a, which together with the upper lip 23 constitutes a submerged inlet for the liquid in the way of a horizontally flattened mouth which directs the entering liquid in a substantially horizontal direction. The deflector bar 29 substantially interposed between the lips 23 and 35a extends substantially parallel thereto and acts as a flow splitter which divides the entering flow of liquid mixture into an upwardly inclined and a downwardly inclined divisional stream. The upwardly inclined stream enters through the throat-like constriction 34, the downwardly inclined stream through a somewhat similar throat-like constriction 34a formed by the deflector bar 29 and the lip or ruga 35a. 36 indicates a third, or substantially vertical baffle plate, suitably supported in the basin as also is deflector 29, by some such means as seats or sockets 37 on the basin walls 14 and 15. 38 represents a divisional wall really forming the rear end of the basin and separating from the body of the basin a liquid discharge column 39 which is substantially vertical and which terminates in a liquid or waste water outlet 40. Sand or other sediment which may collect in the column 39 may be removed therefrom by removing clean-out plug 41, although the sweeping action of the liquid passing through the restriction or throat 42 forming the entrance to the column 39 tends to carry all sediment upwardly through the column to discharge. Another removable plug 43 is provided at the top of the column.

44 indicates the outlet or draw-off for the reclaimed or separated oil or other fluid which constitutes the desired effluent from the interceptor. It is arranged eccentrically in a plate 45 capable of rotational adjustment in a flanged collar 46, for permitting accurate positioning of the outlet pipe 44 with respect to the liquid level in the interceptor.

The vertical baffle plate 36 is shown to extend from a point of elevation intermediate the lower and the upper edges of the deflector bar 29 upwardly to a point defined of what is indicated in Fig. 2 as the "water-line" which in turn is defined by the overflow edge of the waste water outlet 40. Therefore, since the baffle plate 36 does not extend below the lower edge of the baffle bar 29, the baffle plate 36 can be said to be interposed substantially in the path of the upper divisional stream defined by the upper throat-like constriction 34.

Roughly, it can be said that the liquid mixture incident to its split up into the upper and lower divisional stream, undergoes a primary separation of lighter and heavier ingredients, whereupon the upper stream in meeting baffle plate 36 in its path undergoes a secondary separation, the functioning of which separation is characteristic and will be described more precisely hereinafter in the operation of the device.

An interceptor of this type is usable on such unstable objects as ships. When so used, it becomes important to prevent undue movement of the oil reclaimed or separated in the basin, so to that end, there may be provided baffle members or stabilization plates 47 and 48, preferably extending longitudinally of the basin, as shown. These plates may be provided with ribs, teeth or other protuberances 49 for dampening any tendency of the liquid to move bodily. Also the inner edge of each plate may be provided with a downwardly curved lip 50 extending into the body of the liquid for further dampening its tendency to move or splash during tossing of the ship carrying the interceptor. The stabilization plates may be removably secured in place by means of turnbuckles 51 for forcing the plates into supporting lugs or sockets 52 extending inwardly from the walls of the basin.

*Operation.*—The interceptor or separator of this invention is designed to separate from water or heavier liquid, oil or lighter fluid which may be mixed, but not emulsified, therewith. That is, the desired effluent from my interceptor is to contain the lighter substances such as oil, oily material, or grease. The mixture to be treated by the interceptor is flowed thereinto through inlet 20 whereupon the mixture is divergently deflected or guided downwardly toward the side walls and bottom of the basin by the ribs 22 on guide-plate 21 to a substantial submergence below the liquid level in the interceptor, which submergence creates an initial separating impulse upon the floatable substances in the mixture to begin to rise to the surface of the liquid in the main body of the interceptor basin which is maintained quiescent. The incoming mixture after leaving the guide plate 21 encounters or impacts against the deflector bar 29.

This bar in cross-section has the shape of a blunted wedge-like body having the intermediate face 30 and extending at suitable angles therefrom the marginal faces 31a and 32a. The angle between the faces 32a and 30 is shown to be relatively smaller than the obtuse angle formed between the faces 30 and 31a. This bar has several functions in that its inclined front face or intermediate face 30 and its upward extension 31 are engaged by certain of the lighter particles, such as oil, on which separating or rising impulses are already at work to deflect them upwardly to join the quiescent body of liquid thereabove, and the throat 34 formed by the bar 29 and the curved lower portion 23 of guide plate 21 gives a further impulse or boost to hasten the rising of the lighter particles, as indicated by the arrows in the throat as shown in Figure 4. Any heavier particles, such as water or any granular and heavier solids which may be entrained in the mixture, that engage the inclined face 30 are deflected downwardly by it and its downward extension or flange 32. Any lighter particles, such as oil, which may not yet have been separated from the heavier particles, in passing by the downward extension 32 are still further submerged for causing it to act upon them an additional urge to rise, which urge is responded to after passing by the extension, as shown by the arrows in Figure 4. The cross-sectional shape of the bar 29 with its extensions sets up a certain amount of suction behind the bar which further stimulates the rising of any lighter particles which pass under the downward extension 32. Any lighter particles and any intermediate particles which have not yet risen into the quiescent body at the top level in the interceptor still have enough velocity to carry them against the third baffle or plate 36 which changes their direction and accelerates separation of the lighter from the heavier particles. Those with lesser velocity are directed upwardly by the plate as shown by the arrows in Figure 4 while those having greater velocity pass under the plate as shown and are caught in an eddy there-behind which diminishes their velocity and permits them to float slowly upwardly into the superposed quiescent body.

The heavier particles and any entrained heavy solids pass on down along the uneven inclined bottom 16 of the basin gathering momentum as they proceed. By having the bottom 16 corrugated or made bumpy by the rugae 35, and thus provided with hills and valleys of different height, depth and width, the particles are inclined to bounce thereover, which bouncing has the tendency of releasing and impelling upwardly any lighter or floatable particles which may have become entrapped by the heavier particles. That is, as the fluid passes downwardly over the roughened bottom of the basin, turbulence is set up therein due to back wash eddies which are produced by the downward fluid flow and by one eddy encountering another, the result of which turbulence is that the solid and heavier particles have washed from them any lighter material which may have become entrained thereby. By means of the uneven bottom of the basin and the cross or mixed currents produced thereby, an internal washing or scrubbing action takes place centering approximately at a point just about where the reference numeral 35 is located in Figure 2. At this point, suspended matter which is held at a certain position by gravity in the liquid body, is washed free of its lighter material and is carried by suction to outlet 42, while the separated lighter particles rise to the surface of the liquid body in the basin. By the time the heavier particles have reached the lower end or outlet throat 42 of the basin, they not only have had separated therefrom the lighter particles but have gathered such momentum due partly to the incline of the basin bottom 16 and partly to the inward curving of the basin walls 14 and 15 toward the outlet end, that the heavier particles pass through the throat 42 with sufficient velocity to cause them to be deflected or kicked upwardly whereby they freely rise through the column 39 to discharge from outlet pipe 40 to waste. The velocity of flow through throat 42 overcomes the tendency for any solids or grit to be deposited at that point, but if they should be, removal thereof can be accomplised by removing clean-out plug 41.

This operation results in the floating accumulation in a quiescent body at the liquid level in the main body of the basin, a film of the separated oil or other lighter particles. These are continuously removed from the interceptor basin through the oil outlet pipe 44, which by its eccentric adjustment in rotatable plate 45 in flanges 46 can be arranged to permit the oil to skim off therethrough while leaving behind all heavier liquid or water. It is this skimmed-off separated oil or other lighter material, that is the desired product of treatment in the interceptor basin.

The function of the splash or stabilizer plates 47 and 48 has already been described, which generally is to prevent the quiescent body of separated oil to be beaten or mixed again into the water, due to disturbances set up by a tossing ship carrying an interceptor. Distributing action on the separated oil and bodily movement thereof is dampened by these plates with their submerged edges or lips 50 and the protuberances or ribs 49 forming an uneven undersurface thereof. That is, the liquid tends to cling to the uneven surface of the stabilizer plates and is thereby stabilized so that irrespective of the angle assumed by the interceptor carrying vessel, the effluent liquid will be maintained at a level permitting continued operation of the draw-off 44.

Also there has been described how the guide plate 21 is hung on pins 27 extending from brackets 28 on the basin wall. One or more air vents 26a are provided at the top of the guide plate. If this air vent were not provided, the device would become gas or air bound due to the suction produced on the liquid in the basin by the sewer pull thereon. That is these vents or holes have as their purpose the prevention of double trapping which would otherwise result from the arrangement of submerged baffles and outlets. The top 19 for the basin may be applied thereto in any suitable removable manner.

I claim:

1. Separating apparatus of the class described comprising a basin having an inlet for liquid mixture to be separated, an outlet for reclaimed floating substances, and an outlet for water; a baffle plate for directing the mixture entering the basin downwardly to submergence beneath a quiescent body of fluid normally present during operation of the basin, said baffle plate forming together with the surrounding wall portions of the basin a substantially horizontally extending flattened mouth for the mixture to enter; and a flow dividing deflector bar arranged substantially horizontally parallel to said mouth and interposed in the stream of mixture issuing from said mouth and associated with said mouth in a manner to form therewith throat-like passages for divisional streams superimposed one upon the other, said deflector bar shaped to have a substantially wedge-like cross-sectional profile the apex portion of which profile points in a direction opposite to the flow of entering liquid.

2. Separating apparatus of the class described comprising a basin having an inlet, an outlet for reclaimed floating substances, and an outlet for water; a baffle plate for directing the mixture entering the basin downwardly to submergence beneath a quiescent body of fluid normally present during operation of the basin, said baffle plate forming together with the surrounding wall portions of the basin a mouth for the mixture to enter; and a flow dividing deflector means interposed in the stream of mixture issuing from said mouth and associated with said mouth in a manner to form therewith throat-like superimposed passages for divisional streams superimposed one upon another, said baffle plate being approximately S-shaped in vertical cross-section, and comprising a substantially vertically extending body portion and ribs substantially co-extending with said vertical body portion.

3. Separating apparatus according to claim 2, characterized by the fact that the ribs co-extending with said body portion are divergent.

4. Separating apparatus of the class described comprising a basin having an inlet, an outlet for reclaiming floating substances, and an outlet for water; a baffle plate for directing the mixture entering the basin downwardly to submergence beneath a quiescent body of fluid normally present during operation of the basin, said baffle plate forming together with the surrounding wall portions of the basin a mouth for the mixture to enter; and a flow dividing deflector means interposed in the stream of mixture issuing from said mouth and associated with said mouth in a manner to form therewith throat-like superimposed passages for divisional streams superimposed one upon the other, said basin having a bottom sloping from inlet to outlet and provided with rugae uninterruptedly extending transversely on the bottom, forming a substantially uninterrupted corrugated-like bottom surface.

5. Apparatus according to claim 4, in which the rugae are of different heights.

6. Separating apparatus of the class described comprising a basin having an inlet, an outlet for separated fluid, and an outlet for water; and a baffle plate for directing the mixture entering the basin downwardly to submergence beneath a quiescent body of fluid normally present during operation of the basin, characterized by means extending into the quiescent body of fluid to maintain the fluid quiescent during tilting of the basin, said means comprising a non-perforated baffle member arranged in the basin to normally extend substantially parallel to and above the normal liquid level in the tank, said baffle member having marginal portions thereof entering the fluid.

7. Separating apparatus of the class described comprising a basin having an inlet, an outlet for separated fluid, and an outlet for water; and a baffle plate for directing the mixture entering the basin downwardly to submergence beneath a quiescent body of fluid normally present during operation of the basin, characterized by means extending into the quiescent body of fluid to maintain the fluid quiescent during tilting of the basin, said means comprising two plates spaced apart to form a slotted space therebetween, and detachable means for maintaining said plates in place.

8. Interceptor apparatus of the class described for the separation of floating substances from heavier liquid in a mixture comprising a basin substantially oval in plan view, one end of which oval is flattened in a manner whereby there is determined a substantially vertically and transversely extending endwall portion of the basin, said basin having an inlet for the mixture in said endwall portion, an outlet for the heavier liquid at the opposite end of said oval, and an outlet for reclaimed floating substances, and which basin has a substantially longitudinally sloping bottom portion between said ends, which portion is relatively shallow at the inlet end and has a gradual transition into an increasingly depressed and concave configuration towards the outlet end, and which said bottom portion has a sequence of rugae rising therefrom and arranged substantially transversely with respect to the direction of liquid flow passing from end to end of the interceptor apparatus, said rugae furthermore substantially corresponding to and co-extending with the transverse curvature of said bottom portion and forming a substantially uninterrupted corrugated-like bottom surface.

9. Interceptor apparatus of the class described for the separation of floating substances from heavier liquid in a mixture, comprising a basin having a pouch-like and partly ovoid body portion and a substantially oval top portion, and having an inlet at one end, an outlet for the heavier liquid at the other end of the oval, and an outlet for the reclaimed floating substances, said pouch-like body portion being relatively shallow at the inlet end and of increasingly deepening configuration towards the outlet end, and which said ovoid body portion is furthermore formed with a sequence of rugae rising from, and extending substantially transversely of the bottom of the said ovoid portion, said rugae furthermore substantially corresponding to and coextending with the transverse curvature of said ovoid portion and forming a substantially uninterrupted corrugated-like bottom surface thereof, said pouch-like partly ovoid body portion having substantially all of its inner faces merge into each other.

10. In a separating apparatus of the class described comprising a basin having an inlet, an outlet for reclaimed floating substances, and an outlet for water; an arrangement which is characterized by a baffle plate for directing the mixture entering the basin downwardly to submergence beneath a quiescent body of fluid normally present during operation of the basin, said baffle plate having a curved lower portion to form a flow directing lip, a corresponding lower lip itsing from the bottom of the basin, said lower lip in cross-section having a relatively wide base tapering into a rounded crest similar to a mound, both said lips forming a horizontally flattened mouth for directing the entering liquid in substantially horizontal direction, and a flow dividing deflector bar arranged to extend substantially between said lips and so as to divide the entering flow of liquid into an upwardly and downwardly inclined stream, which deflector bar has a substantially wedge-like cross-sectional profile the apex portion of which profile points in a direction opposite to the flow of the entering mixture.

11. Separating apparatus of the class described comprising a basin having an inlet for mixture to be separated, an outlet for reclaimed floating substances, and an outlet for water; a baffle plate for directing the mixture entering the basin downwardly to submergence beneath a quiescent body of fluid normally present during operation of the basin, said baffle plate forming together with the surrounding wall portions of the basin a substantially horizontally extending flattened mouth for the mixture to enter; and a flow dividing deflector bar arranged substantially horizontally parallel to said mouth and interposed in the stream of mixture issuing from said mouth and associated with said mouth in a manner to form therewith throat-like passages for divisional streams superimposed one upon the other, said deflector bar shaped to have a substantially wedge-like cross-sectional profile the apex portion of which profile points in a direction opposite to the flow of entering liquid, and which profile is characterized by effective wedging faces disposed with an angular relationship to each other whereby there is formed an intermediate face and marginal faces extending at an angle from said intermediate face.

12. Separating apparatus of the class described comprising a basin having an inlet for a mixture of heavier and lighter fluid substance, an outlet for the specifically heavier separated liquid, and an outlet for floating substances, a baffle plate for directing the mixture entering the basin downwardly to submergence beneath a relatively quiescent body of fluid normally present during operation of the basin, said baffle plate forming with the adjacent wall portions a mouth directing the entering mixture into said body of fluid; a flow dividing deflector means associated with said mouth in a manner to form therewith throat-like and diverging superimposed passages for a divisional upper and lower stream respectively to effect thereby a primary separation of the lighter and heavier mixture; and submerged baffle means interposed substantially in the path of the upper divisional stream and substantially in a manner to effect a secondary separation of the lighter and the heavier substances thereof.

13. In a separating apparatus of the class described comprising a basin having a submerged inlet in the form of a horizontally extending flattened mouth, an outlet for separated fluid, and an outlet for water; a deflector bar adapted to be placed horizontally parallel to said mouth to act as a flow dividing member for the liquid stream from said mouth, the effective flow dividing faces of said deflector bar being defined mainly by three faces having angular relationship to each other and extending parallel to the longitudinal axis of said deflector bar, which three comprise an intermediate face, and marginal faces extending therefrom under suitable angles, the angular interrelation of said faces being such that in cross-section the deflector bar forms a blunted wedge-like body, one of the angles formed being obtuse, the other angle being relatively smaller than the said obtuse angle.

14. Separating apparatus of the class described comprising a basin having an inlet, an outlet for separated fluid, and an outlet for water, and a baffle plate for directing the mixture entering the basin downwardly to submergence beneath a quiescent body of fluid normally present during operation of the basin, characterized by means extending into the quiescent body of fluid to maintain the fluid quiescent during tilting of the basin, said means comprising an unperforated baffle member arranged in the basin to normally extend substantially parallel to and above the normal liquid level in the tank, said baffle member having depending from its lower face a plurality of protuberances for dampening any tendency of the liquid to move bodily.

15. Separating apparatus of the class described comprising a basin having an inlet for a mixture of heavier and lighter or floating fluid substances, an outlet for the heavier separated fluid substances, and an outlet for the floating substances, a baffle plate for directing the mixture entering the basin downwardly to a point of submergence below a relatively quiescent body of fluid normally present during operation of the basin, said baffle plate forming with the adjacent wall portions a mouth adapted to direct the entering mixture into said body of fluid; a flow dividing deflector means associated with said mouth in a manner to form therewith throat-like and diverging passages for a divisional upper and lower stream respectively; and a submerged substantially vertically extending baffle wall interposed substantially in the path of the upper divisional stream.

16. Separating apparatus of the class described, which comprises a basin having an inlet for a mixture of heavier and lighter or floating fluid substances, an outlet for the heavier separated fluid substances, and an outlet for the floating substances, a baffle plate for directing the mixture entering the basin downwardly to a point of submergence below a relatively quiescent body of fluid normally present during operation of the basin, said baffle plate forming with the adjacent wall portions a horizontally extending mouth portion directing the entering mixture into said body of fluid; a flow dividing deflector bar arranged to extend horizontally parallel to said mouth, said deflector bar having a substantially wedge-like cross-sectional profile with an apex portion pointing in a direction substantially opposite to the flow of the entering liquid and effective in association with said mouth portion to form passages for an upper and a lower divisional stream respectively; and submerged baffle means extending across the basin and substantially interposed in the path of the upper divisional stream.

17. Separating apparatus of the class described, which comprises a basin having an inlet for a mixture of heavier and lighter or floating fluid substances, an outlet for the heavier separated fluid substances, and an outlet for floating substances, a baffle plate for directing the mixture entering the basin downwardly to a point of submergence below a relatively quiescent body of fluid normally present during operation of the basin, said baffle plate forming with the adjacent wall portion a horizontally extending mouth portion directing the entering mixture into said body of fluid; a flow dividing deflector bar arranged to extend horizontally parallel to said mouth portion, said deflector bar having a substantially wedge-like cross-sectional profile with the apex portion thereof pointing in a direction opposite the flow of the entering liquid and effective in association with said mouth portion to form passages for an upper and a lower divisional stream respectively; and a submerged substantially vertical baffle plate extending horizontally across the basin and upwardly from a point of elevation located intermediate the upper and lower edges of the deflector bar.

18. Separating apparatus of the class described comprising a basin having an inlet for a mixture of water and lighter or floating substances, an outlet for reclaimed floating substances, and an outlet for water; a baffle plate for directing the mixture entering the basin downwardly to submergence beneath a quiescent body of fluid normally present during operation of the basin, said baffle plate forming together with the surrounding wall portion of the basin a substantially horizontally extending flattened mouth for the mixture to enter; and a flow-dividing deflector bar arranged substantially horizontally parallel to said mouth and interposed in the stream of mixture issuing from said mouth and associated with said mouth in a manner to form therewith throat-like passages for divisional streams superimposed one upon the other, said deflector bar shaped to have a substantially wedge-like cross-sectional profile the apex portion of which points in a direction opposite to the flow of entering liquid, said wedge-like profile having an upper and a lower trailing edge which lower trailing edge is located further ahead than the upper trailing edge with respect to the direction of the entering stream of mixture.

19. Separating apparatus of the class described comprising a basin having an inlet for a mixture of water and lighter or floating substances, an outlet for reclaimed floating substances, and an outlet for water; a baffle plate for directing the mixture entering the basin downwardly to submergence beneath a quiescent body of fluid normally present during operation of the basin, said baffle plate forming together with the surrounding wall portions of the basin a substantially horizontally extending flattened mouth for the mixture to enter; and a flow dividing deflector bar arranged substantially horizontally parallel to said mouth and interposed in the stream of mixture issuing from said mouth and associated with said mouth in a manner to form therewith throat-like passages for divisional streams superimposed one upon the other, said deflector bar shaped to have a substantially wedge-like cross-sectional profile, which profile comprises an apex portion pointing in a direction opposite to the flow of entering liquid, and an upwardly inclined and a downwardly inclined wing portion extending from said central portion and including between them a hollow potentially to effect eddying of the entering liquid flowing past the respective trailing edges of said wing portions.

SAMUEL L. MARSH.